May 13, 1924.　　　　A. C. JONES ET AL　　　　1,494,250
ANIMAL TRAP
Filed Feb. 3, 1923　　　2 Sheets-Sheet 1
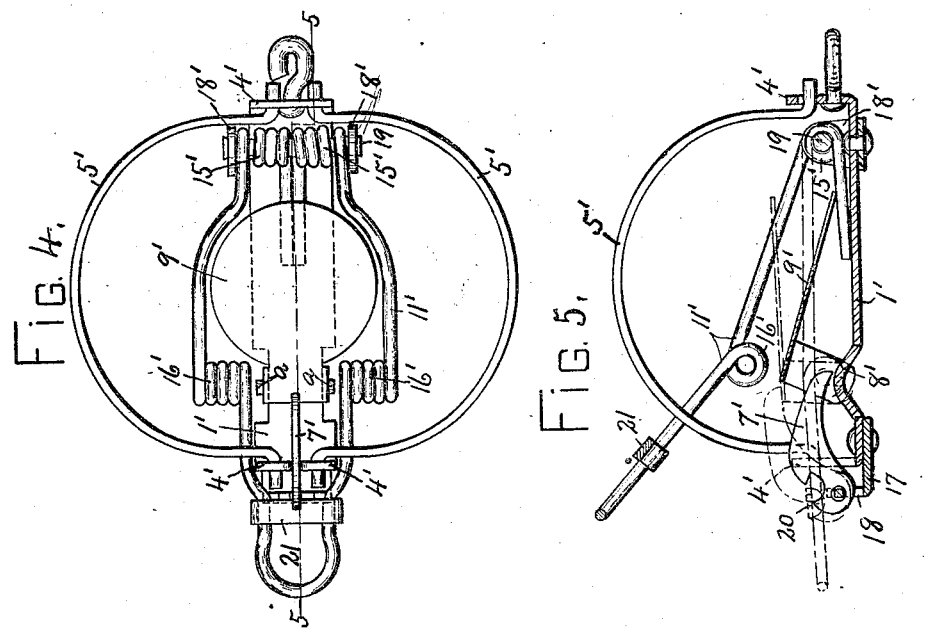
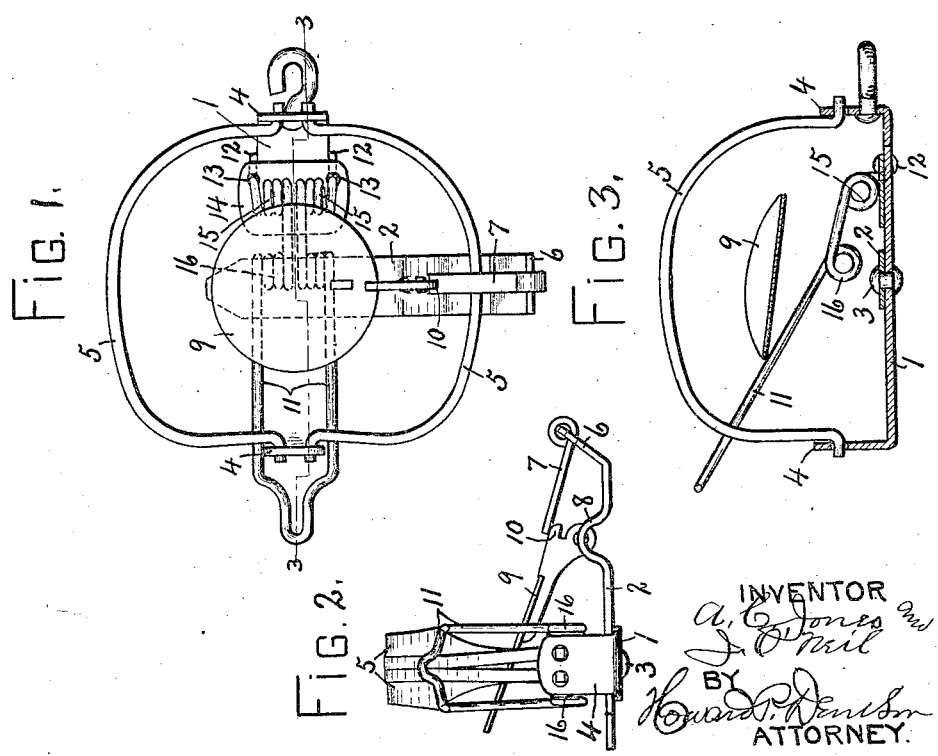
INVENTOR
A. C. Jones and
J. O'Neil
BY
Howard J. Denison
ATTORNEY.

May 13, 1924.
A. C. JONES ET AL
1,494,250
ANIMAL TRAP
Filed Feb. 3, 1923
2 Sheets-Sheet 2
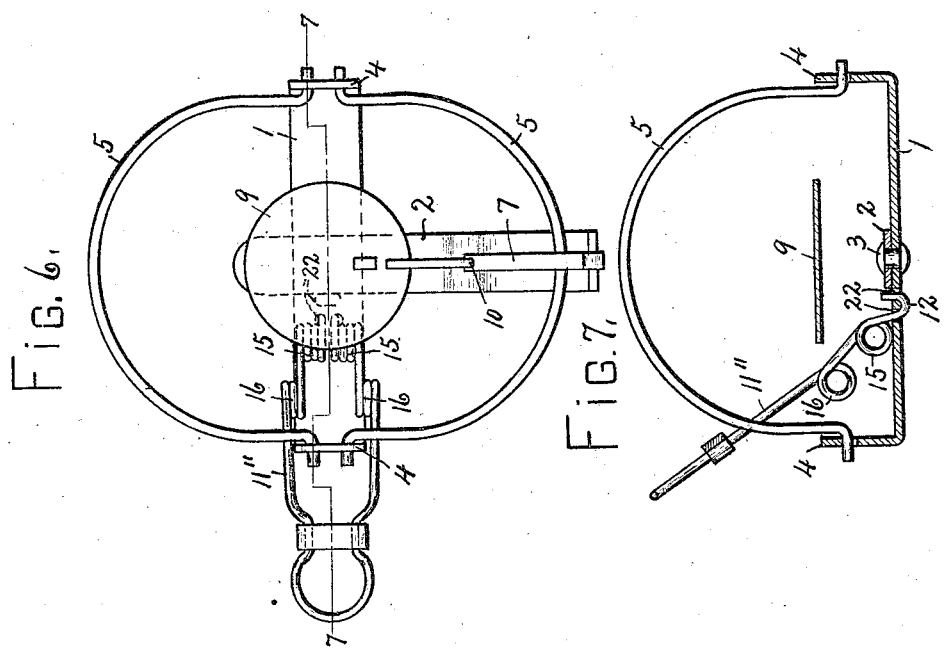

Patented May 13, 1924.

1,494,250

UNITED STATES PATENT OFFICE.

ALLAN C. JONES AND JERAMIAH O'NEIL, OF ONEIDA, NEW YORK, ASSIGNORS TO ONEIDA COMMUNITY, LTD., OF ONEIDA, NEW YORK, A CORPORATION OF NEW YORK.

ANIMAL TRAP.

Application filed February 3, 1923. Serial No. 616,696.

*To all whom it may concern:*

Be it known that we, ALLAN C. JONES and JERAMIAH O'NEIL, citizens of the United States of America, of Oneida, in the county of Madison, in the State of New York, have invented new and useful Improvements in Animal Traps, of which the following, taken in connection with the accompanying drawings, is a full, clear, and exact description.

This invention relates to an animal trap in which a pair of cooperative jaws are pivotally mounted upon a suitable supporting frame with means for holding the jaws open against the action of a retracting spring.

In traps of this character it is customary to employ spring tongues of sheet metal or wire of considerable length extending lengthwise of the jaws and having one end fastened to the frame and its other end provided with an opening for sliding engagement with the outer edges of one end of the jaws, but it is well known that springs of that type after repeated setting of the jaws soon become weakened in tension by bending and thereby reduces their power efficiency.

We have found it more expedient and economical to employ wire springs as the retracting means for the jaws for the reason that it lends itself more readily to the accomplishment of the main purpose of the invention, viz, to permit the use of a plurality of coils in longitudinally spaced relation for reducing to a minimum the bending factor and consequent weakening of the spring by repeated settings of the trap.

In other words, the main object is to break the continuity of the spring wire tongue by bending its intermediate portion into a plurality of resilient coils of two or more convolutions having parallel axes transversely of the length of the tongue so as to increase the rigidity and reduce the bending factor of the remaining portions of the tongue and thereby to obtain greater and more permanent power efficiency in closing the jaws and also permitting the use of relatively smaller gage wire without reducing the power factor.

Another object is to enable the major portion of the spring including the coils to be assembled between the ends of the jaws and thereby to obtain the benefits of increased power of the relatively short springs in addition to compactness and economy of stock.

Other objects and uses relating to specific parts of certain forms of the trap will be brought out in the following description.

In the drawings, Figure 1 is a top plan of an open trap embodying certain features of this invention.

Figure 2 is an end view of the same trap closed.

Figure 3 is a longitudinal vertical sectional view taken on line 3—3, Figure 1, except that the jaws are closed.

Figure 4 is a top plan of a modified form of trap showing the jaws as set in their open positions.

Figure 5 is a longitudinal vertical sectional view taken on line 5—5, Figure 5 except that the jaws are closed.

Figure 6 is a top plan of a further modified form of trap with the jaws set in their open positions.

Figure 7 is a longitudinal vertical sectional view taken on line 7—7, Figure 6 except that the jaws are closed.

In Figures 1 to 3 inclusive, the frame of the trap comprises the lengthwise bar —1— and a cross bar —2— rigidly secured thereto at the crossing by means of a rivet —3— or equivalent fastening device, the ends of the lengthwise bar —1— being provided with upturned ears —4— for receiving and supporting a pair of jaws —5— while the cross bar —2— extends laterally beyond one of the opened jaws and is provided at its outer end with an upturned ear or lug —6— for receiving a pivoted detent —7—.

The intermediate portion of the cross bar —2— at one side of the lengthwise bar —1— is provided with an upwardly pressed portion —8— having a central lengthwise slot and suitable pintles for receiving and supporting a pivoted bait pan —9—.

When the jaws are fully opened, the detent —7— is adjusted over the upper edge of one of them as shown in Figure 1 and engaged with a shoulder —10— on the outer end of the bait pan —9— just over its pivotal connection with the pintles for holding the jaws in their open positions against the action of a retracting spring —11—.

The spring tongue —11— extends lengthwise of the bar —1— and preferably consists of a single piece of spring wire bent into more or less U-shaped form with its opposite arms in transversely spaced relation for engaging the outer edges of one end of the jaws —5— and its ends extended to a point in proximity to the adjacent ends of the jaws and provided with hooks —12— engaging in apertures —13— in the adjacent portion of the frame bar —1— or rather in a plate —14— which is rigidly secured to said bar to form a unitary part thereof.

The intermediate portions of the opposite arms of the spring tongue —11— are provided with a plurality of, in this instance two, coils —15— and —16— in longitudinally spaced relation and having parallel axes transversely of the tongue, said coils being located wholly within or between the ends of the jaws —5— which are pivoted in suitable apertures in the ears or lugs —4—.

The spring —11— including its coils —15— and —16— extends lengthwise of the jaws —5— between the bar —1— and bait pan —9— so that the coils —15— and —16— are in relatively close proximity to the upper face of said bar to allow ample space for the setting and release of the bait pan as the jaws are opened and closed without interfering with the free operation of the spring, the rear coil —15— being in fact, in close contact with the upper face of the bar to assist in supporting the spring in proper position for action.

In the trap just described, the bait pan —9— and its detent —7— extend transversely of the jaws to swing about their respective axes parallel with the axes of movement of the jaws and when the jaws are released and closed by the spring 11, the bait pan is simultaneously thrown upwardly and laterally and tends to cramp the portion of the animal caught between the jaws to prevent its escape.

The trap shown in Figures 4 and 5 is somewhat similar to that previously described except that the cross bar is omitted and the bait pan and its detent are arranged lengthwise instead of transversely of the jaws.

That is, the frame comprises a lengthwise bar —1'— having its ends provided with upturned ears or lugs —4'— for receiving the ends of a pair of pivoted jaws —5'—, said bar being provided at one end with an extension —17— having an upturned lug —18— for receiving and supporting a pivoted detent —7'—.

The intermediate portion of the bar —1'— adjacent the detent —7'— is provided with an upwardly pressed portion —8'— having opposite lugs or suitable pintles —a— for receiving and supporting a pivoted bait pan —9'— wholly between the ends of the jaws —5'— so that the bait pan —9'— and its detent —7'— may swing about parallel axes transversely of that of the jaws —5'—.

The bar —1'— is provided near its opposite ends with upturned lugs —18'— for receiving and supporting a transversely extending pin —19— which in turn constitutes a partial support for the spring tongue —11'—.

This tongue extends lengthwise of the jaws —5'— just above the bar —1'— and preferably consists of a single piece of spring wire bent into U-shaped form and provided with a plurality of coils —15'— and —16'— in longitudinally spaced relation wholly within and between the opposite ends of the jaws —5'—, one of the coils —15'— being wound around the pin or bolt —19— for holding the spring against longitudinal movement between the lugs —18'—.

The ends of the opposite arms of the spring —11'— after being coiled around the pin —19— are returned toward the detent —7'— and against the upper face of the bar —1'— to engage the same between the coils —15'— and —16'— and thereby to assist in maintaining tension of the spring arm —11—.

In this device, the setting of the trap is rendered substantially automatic by the depression of the jaw operating spring and for this purpose, the heel of the detent —7'— is provided with a shoulder —20— arranged in the path of movement of a cross plate —21— connecting the outer ends of the opposite arms of the spring whereby, when the spring is depressed by hand to the position shown by dotted lines in Figure 5, the plate —21— will engage and depress the shoulder —20— thereby elevating the inner end of the detent —7'— so that by inverting the trap, the heel of the bait pan —9'— will fall under the inner end of the detent and the latter will engage the bar —21— to hold the detent in engagement with the bait pan —9'— until the latter is tripped by the animal with the result that the jaws will be closed upon the animal by the force of the spring.

The trap shown in Figures 3 and 7 is very similar to that shown in Figures 1 and 2 except that the spring as —11"— is somewhat shorter and is attached at one end to the frame bar —1— at a point between the cross bar —2— and points of engagement with the jaws.

Otherwise, the same reference letters used to describe the part shown in Figure 1 may apply to like parts shown in these figures.

The spring —11"— in the construction shown in Figure —6— is preferably made of a single piece of spring wire having their inner ends provided with hooks —12— adapted to pass through adjacent apertures —22— and thereby to hold the spring against relative lengthwise movement on the frame while the innermost coil as —15— rests upon the inner face of the frame bar to assist in holding the spring in place.

It will be observed however, that in all of the several modifications the major portions of the springs and particularly the coils thereof are located between the ends of the jaws with the axes of the coils parallel with each other and at right angles to the axes of the jaws.

It will also be observed that the opposite arms of each spring are provided with a plurality of, in this instance two, coils referred to in longitudinally spaced relation so that in reality each spring arm acts upon its corresponding jaw with a slight independent resiliency although the joining of the outer ends of the two arms causes them to exert their combined force in simultaneously closing the jaws under the united force of both sets of coils.

The formation of these coils in longitudinally spaced relation serves to break up the continuity of extension of the spring as a whole into relatively short lengths between and outside of the coils and thereby to greatly reduce the bending factor or liability of weakening of the springs and at the same time permits the use of relatively light wire without sacrificing the power of the springs all of which greatly increases the efficiency of the trap in addition to its reduced cost of manufacture.

I claim:

1. An animal trap comprising a frame, a pair of jaws mounted on the frame, means releasable by an animal for holding the jaws open and a wire spring for closing said jaws having a plurality of coils in longitudinally spaced relation for reducing the lengths and bending factor of the remaining portions of the spring and for imparting greater resiliency and power to the spring.

2. An animal trap as in claim 1 in which the coils are located between the ends of the jaws.

3. An animal trap as in claim 1 in which one coil is adjacent the frame and another coil between the first named coil and the jaw-engaging portion of the spring.

In witness whereof we have hereunto set our hands this 23 day of Jan., 1923.

ALLAN C. JONES.
JERAMIAH O'NEIL.

Witnesses:
JARED E. ALLEN,
ERNEST N. RAUSCHER.